Patented Nov. 6, 1923.

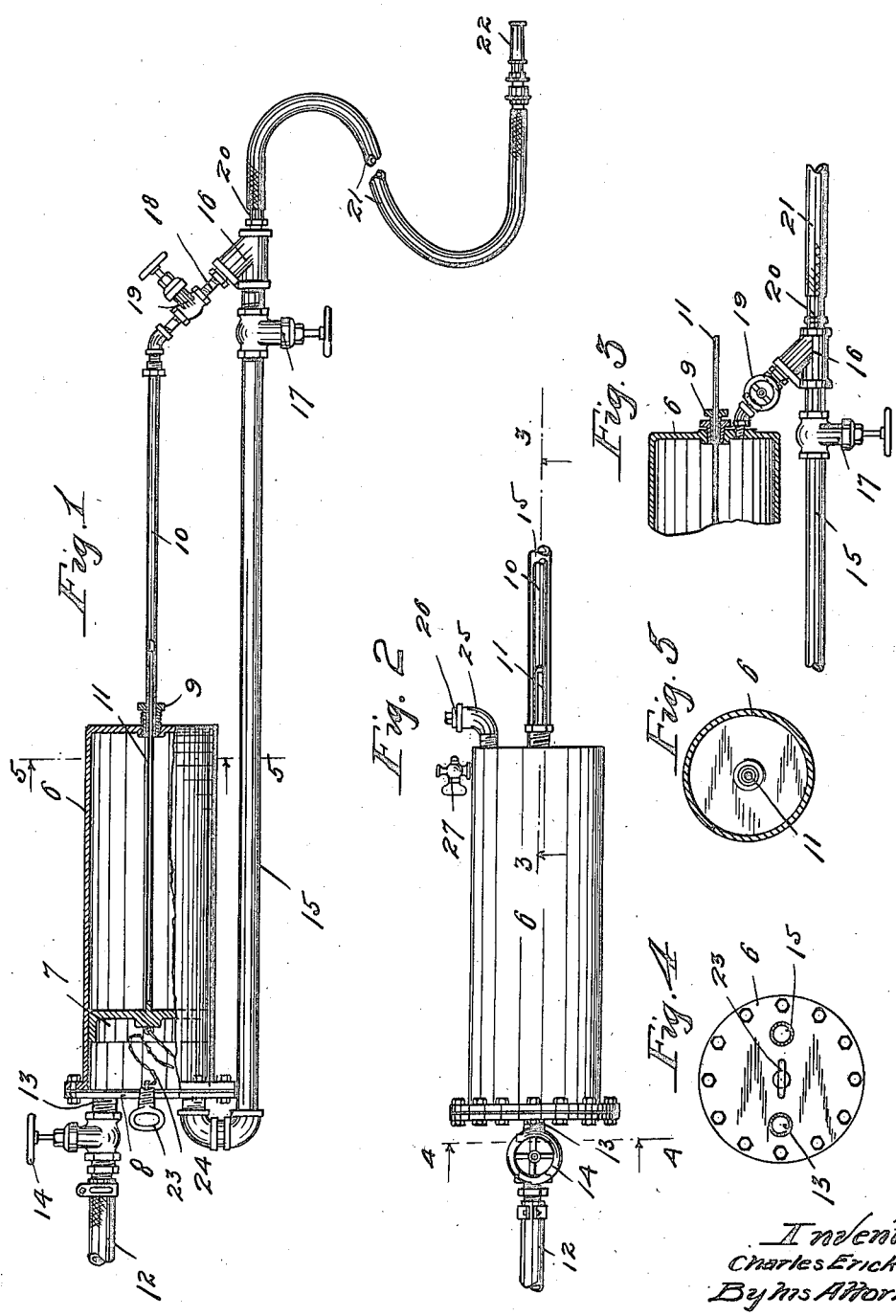

1,473,025

UNITED STATES PATENT OFFICE.

CHARLES ERICKSON, OF MINNEAPOLIS, MINNESOTA.

SPRAYER.

Application filed May 31, 1921. Serial No. 473,586.

*To all whom it may concern:*

Be it known that I, CHARLES ERICKSON, am a citizen of the United States, residing at Minneapolis, in the county of Hennepin and State of Minnesota, have invented certain new and useful Improvements in Sprayers; and I do hereby declare the following to be a full, clear, and exact description of the invention, such as will enable others skilled in the art to which it appertains to make and use the same.

My invention provides an extremely simple and highly efficient hydraulic sprayer adapted for use to commingle solutions of various kinds with a stream of water discharged from a hose or pipe.

A device of this kind may be put to many different uses. For example, the solution may be a nitrate solution to be sprayed upon lawns or the like; it may be insecticide or germicide to be sprayed upon trees or growing vegetation, or might be even a fire-extinguishing solution to be mixed with the stream of water discharged upon a fire.

Generally stated, the invention consists of the novel devices and combinations of devices hereinafter described and defined in the claims.

The invention is illustrated in the accompanying drawings, wherein like characters indicate like parts throughout the several views.

Referring to the drawings:

Fig. 1 is a plan view with some parts sectioned showing the apparatus;

Fig. 2 is a side elevation of the device with some parts broken away;

Fig. 3 is a section on the line 3—3 of Fig. 2;

Fig. 4 is a section on the line 4—4 of Fig. 2; and

Fig. 5 is a section on the line 5—5 of Fig. 1.

The numeral 6 indicates a solution tank in the form of a cylinder in which works a piston 7. The cylinder 6, as shown, has but one removable head 8, and axially secured to the other head thereof, by means of a threaded gland 9 or the like, is a transparent tube 10. This transparent tube 10 is preferably a glass tube, but might be of any form or construction permitting a rod or the like to be seen when within the same. The piston 7 is provided with a small rod 11 that works freely and with a great deal of clearance within the transparent tube 10.

The water, to be sprayed, will be delivered through a hose 12 or the like from a source of water under pressure, such as a city water main or an elevated tank. This hose 12 is connected to the rear end of the cylinder 6, through a short pipe 13 equipped with a valve 14.

A water discharge pipe 15 extends from the rear end of the cylinder 6, being, as shown, connected to the head 8. A Y-coupling 16 is attached to the discharge end of the water pipe 15 and, inward of said coupling, said pipe is provided with a valve 17. The outer end of the transparent tube 10 is connected to one branch of the Y-coupling 16 by a small pipe 18 equipped with a valve 19. The outer end of the coupling 16 has a nipple 20 to which is attached a hose 21 equipped at its free end with a spraying nozzle 22.

Screw-threaded into an opening in the cylinder head 8 is a plug 23, which, in the preferred arrangement, is connected to the piston head 7 by a chain or cable 24. At or near its discharge end, the cylinder is provided with a filler tube 25 normally closed by a plug 26. The numeral 27 indicates a normally closed vent cock applied at or near the same end of the cylinder. The operation of this spraying apparatus will be substantially as follows:

While the piston 7 is at the rear end of the cylinder, the plug 26 is removed and the solution is poured into the cylinder through the filler neck 25, the vent cock 27 being then preferably open to permit the displacement of air from the cylinder. When the cylinder is thus filled, the plug 26 is applied and the vent cock 27 is closed. Of course, while the above filling action is taking place, the supply valve 14 must be closed and, preferably, the valves 17 and 19 will also then be closed.

When the spraying action is to be started, the valves 14 and 17 must be opened to produce a flow of water under pressure into and from the rear end of the cylinder and out through the pipe 15, hose 21 and nozzle 22. If the valve 19 be closed, then the spray will be entirely water. The pressure of the water in the cylinder, acting on the piston, will tend to force the same forward and the piston will thus move whenever the valve 19 is opened. When the piston 7 moves forward, the solution will be forced through the transparent tube 10 and pipe 18 into the coupling 16 where it will be commingled with the water and forced out through the hose and nozzle and discharged in the spray. The extent to which the valve 19 is opened will determine the proportionate amount of the solution that will be delivered into the water and discharged in the spray.

The valve 14 should be always wide open and the flow of the water regulated by adjustments of the valve 17, that is, of course, except when it is desired to cut off the supply of water from the cylinder.

The movement of the valve stem 11, in the transparent tube 10, can be observed and thereby the rate at which the solution is being discharged may be quite accurately determined. Another object of extending the valve stem or indicating rod 11 into a transparent or sight tube is that a packed joint is not made necessary, since the tube 10 is loose around the stem or rod so that it can serve also as a discharge tube for the solution.

When the piston 7 has nearly or quite reached the discharge end of the cylinder, the solution will have been all or nearly all discharged from the cylinder. To return the piston to the rear end of the cylinder so that it can be refilled, it will be first necessary to close the valve 14 and then to remove the plug 23 so as to afford a vent; and when this is done, by pulling rearward on the removed plug and cable 24, the piston can be drawn back to the starting point, that is, to its retracted position.

The efficiency of this device has been thoroughly demonstrated in practice. It is especially adapted for use where large quantities of solution must be sprayed and where the saving of labor is an important factor. The operation of this apparatus by one man is an extremely easy job and the one man operating the same can spray a very great area in comparison to the time consumed.

What I claim is:

1. A spraying device comprising a cylinder, a piston working therein, a water supply pipe connected to deliver all of the flowing water into one end of said cylinder, a water discharge pipe extended from the same end of the cylinder, and a solution delivery tube extended from the other end of said cylinder and connected to said water discharge pipe, said piston having a rod working in said tube.

2. A spraying device comprising a cylinder, a piston working therein, a water supply pipe connected to deliver all of the flowing water into one end of said cylinder, a water discharge pipe extended from the same end of the cylinder, a solution delivery tube extended from the other end of the cylinder and connected to said water discharge pipe, a plug in the water-receiving end of said cylinder, and a flexible connection between said plug and piston, whereby the latter may be retracted when said plug is removed.

3. A spraying device comprising a cylinder, a piston working therein, a water supply pipe connected to deliver all of the flowing water into one end of said cylinder, a water discharge pipe extended from the same end of the cylinder, and a solution delivery tube extended from the other end of the cylinder and connected to said water discharge pipe, said piston having a rod working in said solution delivery tube, and said tube being transparent at least in part so that the position of said rod therein may be observed.

4. The structure defined in claim 1 in further combination with a connection for retracting the piston.

In testimony whereof I affix my signature.

CHARLES ERICKSON.